United States Patent [19]
Moulton et al.

[11] 3,856,710

[45] Dec. 24, 1974

[54] NICKEL/COPPER CHROMITE CATALYSTS FOR HYDROGENATING EDIBLE OILS

[75] Inventors: Karl J. Moulton, Brimfield; Robert E. Beal, Elmwood, both of Ill.

[73] Assignee: The United States of America as represented by the Secretary of Agriculture, Washington, D.C.

[22] Filed: Feb. 4, 1974

[21] Appl. No.: 438,960

[52] U.S. Cl. ............................................. 252/470
[51] Int. Cl. .......................................... B01j 11/22
[58] Field of Search .................................. 252/470

[56] References Cited
UNITED STATES PATENTS

| | | | |
|---|---|---|---|
| 1,172,062 | 2/1916 | Schwarcman | 252/470 X |
| 2,416,901 | 3/1947 | Carmody | 252/470 X |
| 3,152,998 | 10/1964 | Moss | 252/470 |

*Primary Examiner*—Paul F. Shaver
*Attorney, Agent, or Firm*—M. Howard Silverstein; Max D. Hensley; David G. McConnell

[57] ABSTRACT

Vegetable oils are hydrogenated with mixed copper and nickel catalyst compositions. Oils with linolenate contents of about 7 percent are partially hydrogenataed to form liquid oils containing no linolenate with selectivities only slightly lower than those with copper catalysts alone and with significantly accelerated hydrogenation rates.

3 Claims, No Drawings

NICKEL/COPPER CHROMITE CATALYSTS FOR HYDROGENATING EDIBLE OILS

BACKGROUND OF THE INVENTION

This invention pertains to catalyst compositions which contain both copper and nickel components and which are useful for the selective partial hydrogenation of polyunsaturated vegetable oils.

Liquid salad and cooking oils can be prepared by winterizing vegetable oils which have been partially hydrogenated with nickel catalysts. Nickel catalysts are rapid, but they are only slightly selective. That is, triunsaturated components which are present in many vegetable oils and which have been shown to be responsible for flavor and oxidative instability cannot be completely removed by hydrogenation with nickel catalyst without also undesirably converting significant amounts of the diunsaturated components to monounsaturates and some of the monounsaturated components to saturates. Yields of liquid oil product resulting from winterization of triunsaturate-free nickel-reduced oils are impractically low and contain high levels of trans isomers which are also considered to be detrimental.

Moulton et al. (J. Amer. Oil Chem. Soc. 48: 499-502, 1971) found that soybean oils, containing over 7 percent linolenate, could be partially hydrogenated selectively with copper chromite catalysts to give liquid oils containing no linolenate and which, when winterized, yield about the same amounts of liquid oil [e.g., 88% yield of an oil having an I.V. (iodine value) of 112 and a trans isomer content of 11%] as nickel-hydrogenated-winterized soybean oils which still contain 3 percent linolenate. Nickel-reduced and winterized soybean oil containing essentially no linolenate obtained in only 60 percent or lower yield have I.V.'s of about 96 and trans isomer content of about 19 percent. When compared to nickel-hydrogenated-winterized soybean oil containing 3 percent linolenate, copper chromite-hydrogenated-winterized soybean oil containing no linolenate have significantly better high-temperature stability and are much less susceptible to the development of disagreeable odors when heated to frying temperature (Evans et al., J. Amer. Oil Chem. Soc. 49: 578, 1972). However, copper chromite catalysts are less active then nickel and require longer hydrogenation times even when the hydrogenations are performed at higher temperatures, pressures, and catalyst concentrations. Nickel catalysts become slightly more selective as temperature increases, but trans isomer content increases to undesirable levels. Selectivity (K) is defined herein as the rate of decrease of triunsaturates compared to the rate of decrease of diunsaturates (Butterfield et al., J. Amer. Oil Chem. Soc. 44: 549, 1967).

Copper was added to nickel catalysts as early as 1918 because of its effect of lowering catalyst activation temperatures (U.S. Pat. No. 1,257,405). D. Swern (*Bailey's Industrial Oil and Fat Products*, Third Edition, Interscience Publishers, New York, 1964, pp. 845–846) describes the use of copper in nickel catalysts as promoters (i.e., substances that enhance the activity of catalysts without acting as catalysts themselves). Paterson (U.S. Pat. No. 2,357,352) used mixtures of reduced metallic nickel and copper-chromium-oxide in amounts ranging from 5 to 50 parts nickel to 1000 parts Cu-Cr-O in order to simultaneously hydrogenate and decolorize vegetable oils. Toyama (Final Technical Report, Project No. UR-All-(40)-5, Grant No. FG-Ja-103, PL 480 Foreign Research Program of the U.S. Department of Agriculture) reports on the partial hydrogenation of soybean oils in the presence of catalysts prepared by precipitating copper and nickel onto Kieselguhr supports in ratios of from 9:1:10 1to 9.9:0.1:10 0.1: Cu:Ni:Kieselguhr. He concludes that, within the limits of the catalyst used, increasing the Cu:Ni ratio decreases the rate but only slightly increases selectivity over that of straight nickel catalysts.

With wet-reduced catalysts having the same Cu:Ni:Kieselguhr ratios as above, Toyama (supra) hydrogenated soybean oil to low levels of linolenate content but with very poor selectivity (i.e., K's of about 3 or lower), and trans isomer contents of up to 30 percent. It is the object of this invention to provide catalyst compositions which contain both copper and nickel for the partial hydrogenation of vegetable oils and which, when compared to the so-called copper chromite catalysts of the prior art, will significantly increase hydrogenation rate without significantly decreasing the catalyst's selectivity or increasing trans isomer content of the hydrogenated oil.

In accordance with the above-stated object, we have discovered a catalyst composition for the selective partial hydrogenation of vegetable oils consisting essentially of a mixture of a nickel catalyst consisting essentially of nickel metal and hardened vegetable oil, and a copper chromite catalyst in proportions such that the weight ratio of nickel metal to copper chromite catalyst is from about 0.125:1000 to 0.5:1000.

DETAILED DESCRIPTION OF THE INVENTION

Nickel catalysts suitable for use in the claimed composition are those which contain nickel metal and hardened vegetable oil, such as those described as wet-reduced nickel catalyst in *Bailey's Industrial Oil and Fat Products*, supra, p. 838. Nickel catalysts of the type described above which contain 25 percent nickel by weight metal and 75 percent hardened vegetable oil are commercially available and are therefore the preferred nickel catalysts for use in the examples, infra. However, catalysts of this type containing other amounts of nickel are easily prepared and are considered suitable for use in the invention.

Copper chromite catalysts suitable for use in the claimed composition are of the type variously known as copper-chromiumoxide, Cu-Cr-O, copper-chromium, Cu-Cr, Cu-Cr-Mn, and Cu-Cr-Ba catalysts (U.S. Pat. No. 2,307,065; Paterson, supra; Moulton et al., supra; and Moulton and Moore, J. Amer. Oil Chem. Soc. 46(12): 662-666, 1969). The proportions of copper and chromium are normally not considered to be critical but an atomic ratio of about 1:1 is generally preferred. The presence of about 0.1 mole of an alkaline earth metal oxide (e.g., BaO and CaO) in the above copper chromite catalysts is also preferred as a stabilizer. Copper chromite catalysts containing from 16 percent to 40 percent by weight are commercially available. One containing about 40 percent CuO, 48 percent $Cr_2O_7$, and 12 percent BaO by weight is preferred.

The claimed compositions are preferably prepared by mechanically mixing suitable nickel and copper chromite catalysts of the type described above. Activation of the catalysts can be performed previous to or simultaneously with the hydrogenation. However, activating catalysts in the presence of the oil being hydrogenated increases hydrogenation times.

Hydrogenations catalyzed by the instant compositions are performed in essentially the same manner and with the same catalyst concentrations as those catalyzed by prior art copper chromite catalysts.

Analyses of hydrogenations performed with the instant compositions and under identical conditions except for the ratio of nickel catalyst to copper chromite catalyst showed that the claimed catalyst compositions (i.e., those containing from 0.125 to 0.50 parts nickel metal per thousand parts copper chromite catalyst) gave selectivities ranging from 5 to 10, copper chromite catalysts containing no nickel gave selectivities of from 8 to 17, while catalyst compositions containing from 2.5 to 5 parts nickel metal per thousand parts copper chromite catalyst gave selectivities of only 2 or 4. The claimed catalyst compositions, when compared to copper chromite catalysts containing no nickel, consistently hydrogenated vegetable oils at significantly faster rates. When soybean oils were hydrogenated with the claimed compositions to the point of complete reduction of linolenate, filtered, and winterized, liquid salad oils were produced in about 90 percent yield which passes the standard cold test of the American Oil Chemists' Society. The same oils hydrogenated to zero linolenate with nickel catalysts yielded only about 60 percent winterized oil.

The following examples should not be construed as limiting the invention which is defined by the claims. All percentages and parts expressed herein except for fatty acid composition of vegetable oils as analyzed by gas liquid chromatography are by weight.

EXAMPLES 1–14

For each set of conditions, 2,500 g. from a single lot of commercially refined and bleached (I.V. 130) soybean oil (SBO) was hydrogenated in a 1-gal. autoclave equipped with auxiliary electric strip heaters and an internal coil for either steam heating or water cooling. Provisions were incorporated in the design of the convertor for either hydrogen or nitrogen admission up to 100 p.s.i.g. and vacuum to 30 in. Oil and catalyst were stirred rapidly by a gas dispersion agitator, described earlier by Beal et al., J. Amer. Oil. Chem. Soc. 31: 619, 1954, which dispersed headspace gas into the oil.

Catalyst compositions were prepared by mechanically mixing an active nickel catalyst, Ni-cat (25% Ni in hardened vegetable oil) with an active copper chromite catalyst, Cu-Cr-cat (39% CuO, 49% CrO, 12% BaO). Mixed catalysts were prepared containing 0, 0.5, 1, 2, 10, and 20 p.p.t. Ni-cat (equivalent to 0, 0.125, 0.25, 0.5, 2.5, and 5 p.p.t. nickel) in Cu-Cr-cat. These mixed catalyst compositions were compared by hydrogenating soybean oil with them at Cu-Cr-cat concentrations in the oil of 1.0, 0.5, and 0.25 percent. Testing was conducted in order of increasing Ni-cat content in the mixed catalyst starting with 0 and finishing with 20 p.p.t. This procedure prevented a catalyst composition low in nickel from possibly being contaminated by one containing more nickel. Multiple runs with catalyst compositions of the same Ni-cat content were conducted before moving to those having higher Ni-cat content.

Soybean oil and catalyst compositions were charged to the convertor; the convertor was alternately purged with nitrogen and evacuated three times, and then its contents were stirred vigorously while heating under vacuum to a constant 175° C. at which time hydrogen was admitted and maintained at a pressure of 50 p.s.i.g. Samples (20 ml.) were withdrawn from the convertor periodically onto solid carbon dioxide to cool and protect the hydrogenated product from oxidation and filtered through filter aid. These samples were analyzed immediately by refractive index at 40° C. and later by GLC, UV, and IR spectroscopy according to the methods described below. After hydrogenation to the desired degree as indicated by refractive index, the convertor was evacuated; the remaining oil was cooled to 80° C under vacuum and filtered. The filtered product was collected under nitrogen, packaged under nitrogen, and stored at 0° C. The converter was scrupulously cleaned with filtered soybean oil to remove catalyst traces and kept under positive nitrogen pressure between hydrogenation tests to prevent oil oxidation.

The parent soybean oil and partially hydrogenated soybean oil products were esterified with methanolic $BF_3$ reagent according to Metcalfe et al., Anal. Chem. 38: 514, 1966, and analyzed as follows: (a) Percentage fatty acid composition was determined by gas liquid chromatography (GLC) with an F&M Model 720 gas chromatograph. The 9 ft. × ¼ in. stainless steel column was packed with 20 percent diethylene glycol succinate (Hi Eff 1 BP) on 80–100 mesh Gas Chrom P (Applied Science Laboratories, Inc., State College, Pennsylvania). The conductivity detector had a bridge current of 150 ma. A 1-$\mu$l. sample was inserted at an injection temperature of 300° C. into the column at 200° C. The helium carrier gas rate was 75 cc./min. and detector temperature, 320° C. (b) Percentage trans isomer was determined with a perkin-elmer Model 337 IR spectrophotometer according to AOCS Tentative Method Cd 14-61 [*Official and Tentative Methods of the American Oil Chemists' Society*, Vol. I and II, Third Edition, AOCS, Champaign, Illinois, 1964 (revised to 1970)]. (c) Percentage linoleate and linolenate (conjugatable) were determined by reading values from a GLC alkali isomerized correlation graph (Moulton et al., supra) for products containing more than 42 percent linoleate (by GLC) and analyzed by AOCS Official Method Cd 7-58 (*Official and Tentative Methods of the American Oil Chemists' Society*, supra) for products containing 42 percent (by GLC) linoleate and less. (d) Percentage conjugated diene was determined by AOCS Official Method Cd 7-58 (supra) with a Beckman DU-2 spectrophotometer.

Iodine values were calculated from fatty acid composition, as determined by GLC and as adjusted for certain conjugated dienes with the same retention time as linolenate.

Selectivity ratios ($K_{Le}/K_{Lo}$) were calculated according to the method described by Butterfield et al. (supra).

See Table 1 for all data.

Table 1

| Example | Ni catalyst in copper chromite, p.p.t. | Calculated I.V. | Saturated $C_{16}$ | $C_{18.0}$ | Monoene, $C_{18.1}$ | Diene Conjugatable $C_{18.2}^1$ | Conjugated $C_{18.2}$ | Nonconjugatable $C_{18.2}^2$ | Triene, $C_{18.3}$ | trans | Selectivity, $K_{Lc}/K_{Lo}$ | Hydrogenation time, min. |
|---|---|---|---|---|---|---|---|---|---|---|---|---|
| Original SBO | | 130 | 11.2 | 4.9 | 25.8 | 50.7 | 0.4 | | 7.4 | 0 | — | — |
| Catalyst concentration in oil: 1.0% ||||||||||||
| 1 | 0 | 122 | 11.3 | 4.8 | 29.7 | 48.5 | 1.2 | 1.4 | 3.1 | 4 | 8 | 5 |
| | 0 | 117 | 11.2 | 4.7 | 33.5 | 47.0 | 0.8 | 1.8 | 1.1 | 7 | 11 | 15 |
| | 0 | 113 | 11.1 | 4.6 | 37.3 | 43.5 | 0.6 | 2.9 | 0 | 10 | — | 30 |
| 2 | 1.0 | 120 | 11.3 | 4.8 | 30.8 | 47.7 | 1.4 | 1.4 | 2.6 | 5 | 8 | 5 |
| | 1.0 | 112 | 10.9 | 5.1 | 39.1 | 41.0 | 0.7 | 2.7 | 0.5 | 11 | 8 | 15 |
| | 1.0 | 107 | 11.0 | 4.9 | 44.2 | (38.5) | 0.6 | 0.8 | (0) | 13 | — | 20 |
| 3 | 2.0 | 120 | 11.2 | 4.9 | 32.2 | 43.5 | 1.2 | 1.9 | 3.1 | 5 | 5 | 5 |
| | 2.0 | 114 | 11.1 | 4.8 | 37.7 | 41.5 | 0.8 | 3.0 | 1.1 | 9 | 6 | 10 |
| | 2.0 | 108 | 11.3 | 5.3 | 41.9 | (38.1) | 0.6 | 2.5 | (0.4) | 11 | 7 | 15 |
| 4 | 10.0 | 114 | 11.2 | 5.2 | 37.2 | 40.3 | 0.8 | 2.8 | 2.5 | 7 | 4 | 3 |
| | 10.0 | 106 | 11.1 | 5.4 | 44.9 | (34.3) | 0.6 | 2.9 | 1.0 | 11 | 4 | 6 |
| | 10.0 | 94 | 11.4 | 6.3 | 56.1 | (22.8) | 0.3 | 2.9 | 0.2 | 17 | 4 | 10 |
| Catalyst concentration in oil: 0.5% ||||||||||||
| | 0 | 119 | 11.0 | 4.9 | 31.7 | 48.0 | 1.1 | 1.5 | 1.8 | 6 | 10 | 15 |
| | 0 | 115 | 11.6 | 4.8 | 35.0 | 45.5 | 0.7 | 2.2 | 0.2 | 9 | 17 | 40 |
| | 0 | 111 | 11.1 | 4.9 | 39.5 | (41.2) | 0.5 | 1.7 | 0.1 | 12 | 14 | 100 |
| 6 | 0.5 | 120 | 11.3 | 4.9 | 30.7 | 48.5 | 1.0 | 1.5 | 2.1 | 5 | 10 | 15 |
| | 0.5 | 114 | 11.4 | 5.0 | 38.2 | 41.2 | 0.5 | 3.1 | 0.6 | 11 | 8 | 45 |
| | 0.5 | 108 | 11.4 | 5.3 | 41.3 | (39.4) | 0.5 | 2.1 | (0) | 14 | — | 65 |
| 7 | 1.0 | 124 | 11.6 | 5.0 | 27.8 | 48.6 | 1.1 | 1.3 | 4.6 | 2 | 7 | 5 |
| | 1.0 | 114 | 11.6 | 5.3 | 35.3 | 43.7 | 0.7 | 2.6 | 0.8 | 9 | 9 | 25 |
| | 1.0 | 111 | 11.8 | 5.3 | 38.3 | 40.5 | 0.6 | 2.9 | 0.6 | 11 | 6 | 35 |
| | 1.0 | 107 | 11.4 | 5.6 | 42.2 | (38.7) | 0.7 | 1.4 | (0) | 14 | — | 50 |
| 8 | 2.0 | 126 | 10.7 | 4.6 | 28.4 | 49.4 | 1.1 | 1.2 | 4.6 | 3 | 7 | 5 |
| | 2.0 | 117 | 11.0 | 4.9 | 34.8 | 44.0 | 0.9 | 2.4 | 2.0 | 8 | 6 | 15 |
| | 2.0 | 112 | 11.1 | 5.1 | 39.1 | 40.2 | 0.6 | 3.3 | 0.6 | 11 | 7 | 25 |
| | 2.0 | 109 | 11.2 | 5.4 | 41.0 | (38.9) | 0.5 | 2.7 | (0.3) | 12 | 8 | 32 |
| 9 | 10.0 | 119 | 11.6 | 5.3 | 31.7 | 44.5 | 0.9 | 2.3 | 3.7 | 4 | 4 | 3 |
| | 10.0 | 112 | 11.5 | 5.4 | 38.5 | (39.2) | 0.7 | 2.3 | (2.4) | 10 | 4 | 6 |
| | 10.0 | 102 | 11.4 | 5.9 | 47.5 | (30.1) | 0.5 | — | (0.7) | 14 | 4 | 10 |
| Catalyst concentration in oil: 0.25% ||||||||||||
| 10 | 0 | 121 | 11.1 | 4.7 | 30.1 | 49.5 | 1.0 | 1.2 | 2.4 | 5 | 11 | 45 |
| | 0 | 115 | 11.1 | 4.5 | 35.3 | 46.0 | 0.7 | 2.2 | 0.2 | 8 | 17 | 195 |
| | 0 | 111 | 10.8 | 4.7 | 40.6 | (39.4) | 0.5 | 4.0 | (0) | 13 | — | 405 |
| 11 | 1.0 | 121 | 11.1 | 4.5 | 31.3 | 47.0 | 0.8 | 2.0 | 3.3 | 6 | 6 | 180 |
| | 1.0 | 115 | 11.4 | 4.8 | 35.7 | 44.0 | 0.7 | 2.3 | 1.1 | 10 | 8 | 330 |
| | 1.0 | 111 | 11.3 | 5.0 | 39.5 | 39.5 | 0.7 | 3.0 | 1.0 | 12 | 6 | 420 |
| 12 | 2.0 | 122 | 11.0 | 4.7 | 30.7 | 47.3 | 1.0 | 1.8 | 3.5 | 4 | 6 | 15 |
| | 2.0 | 116 | 11.2 | 4.7 | 35.0 | 44.5 | 0.7 | 2.5 | 1.4 | 8 | 8 | 45 |
| | 2.0 | 111 | 11.2 | 5.5 | 38.1 | 41.0 | 0.6 | 3.2 | 0.4 | 12 | 9 | 75 |
| 13 | 10.0 | 123 | 11.2 | 5.0 | 30.7 | 45.5 | 0.6 | 2.2 | 4.8 | 4 | 3 | 10 |
| | 10.0 | 118 | 11.1 | 5.2 | 34.5 | 42.2 | 0.6 | 2.8 | 3.6 | 8 | 3 | 20 |
| | 10.0 | 111 | 11.1 | 5.7 | 40.3 | (37.8) | 0.4 | 2.3 | (2.4) | 11 | 3 | 40 |
| 14 | 20.0 | 119 | 11.3 | 5.4 | 33.0 | 42.5 | 0.7 | 2.8 | 4.3 | 5 | 3 | 5 |
| | 20.0 | 116 | 11.0 | 5.3 | 36.1 | 40.3 | 0.6 | 3.0 | 3.7 | 8 | 2 | 10 |
| | 20.0 | 111 | 11.0 | 5.8 | 41.3 | (36.4) | 0.4 | 2.7 | (2.4) | 11 | 3 | 15 |

Figures in parentheses are analytical values.
Determined by difference between total diene value (by GLC) and conjugatable diene.

We claim:

1. A catalyst composition for the selective partial hydrogenation of vegetable oils consisting essentially of a mixture of a nickel catalyst consisting essentially of nickel metal and hardened vegetable oil, and a copper chromite catalyst in proportions such that the weight ratio of nickel metal to copper chromite catalyst is from about 0.125:1000 to 0.50:1000. 1000.

2. A catalyst composition as described in claim 1 wherein the copper chromite catalyst contains about 40 percent CuO, 48 percent $Cr_2O_7$, and 12 percent BaO by weight.

3. A catalyst composition as described in claim 2 wherein the nickel catalyst consists essentially of about 25 percent by weight nickel metal and about 75 percent by weight hardened vegetable oil.

* * * * *